United States Patent [19]
Hertel

[11] 3,902,232
[45] Sept. 2, 1975

[54] CUTTING TOOL BIT

[76] Inventor: Karl Hertel, Odenberger Str. 29, D-8500, Nuremberg, Germany

[22] Filed: Aug. 3, 1973

[21] Appl. No.: 385,241

[30] Foreign Application Priority Data
Oct. 18, 1972 Germany............................. 2250925
Jan. 18, 1973 Germany............................. 2302304

[52] U.S. Cl..................................... 29/95 R; 29/96
[51] Int. Cl.² ......................................... B26D 1/00
[58] Field of Search ............................. 29/96, 95 R

[56] References Cited
UNITED STATES PATENTS

| | | |
|---|---|---|
| 3,137,059 | 6/1964 | Hertel..................................... 29/96 |
| 3,226,797 | 1/1966 | Hertel................................ 29/96 X |
| 3,303,553 | 2/1967 | Severson................................. 29/96 |
| 3,316,616 | 5/1967 | Milewski................................. 29/96 |
| 3,355,786 | 12/1967 | Hargreaves............................. 29/96 |
| 3,541,655 | 11/1970 | Stier.................................... 29/95 R |

Primary Examiner—Leonidas Vlachos
Attorney, Agent, or Firm—Spencer & Kaye

[57] ABSTRACT

A cutting tool having a cutting bit with two cutting edges, the cutting bit being clamped in a holder, with one cutting edge only exposed, by means of a clampable shank secured in the body of the holder and a pin engaging into a hole in the cutting bit. The cutting edges on the cutting bit may be plunge cutting edges and the clampable shank and pin may be integrally formed with a support plate for the cutting bit.

5 Claims, 10 Drawing Figures

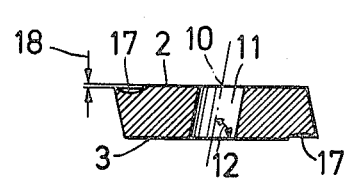
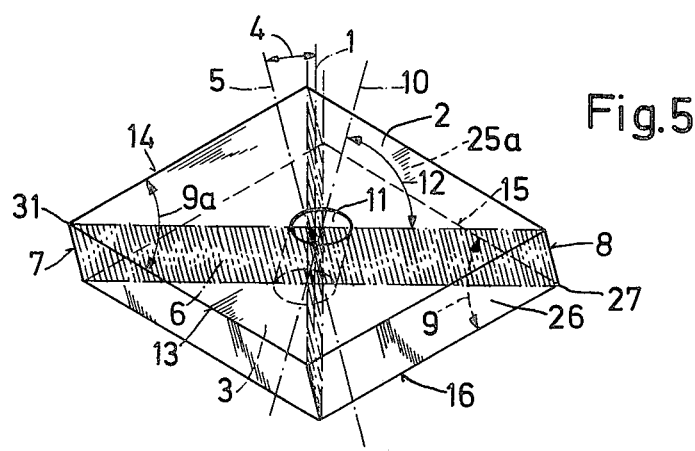
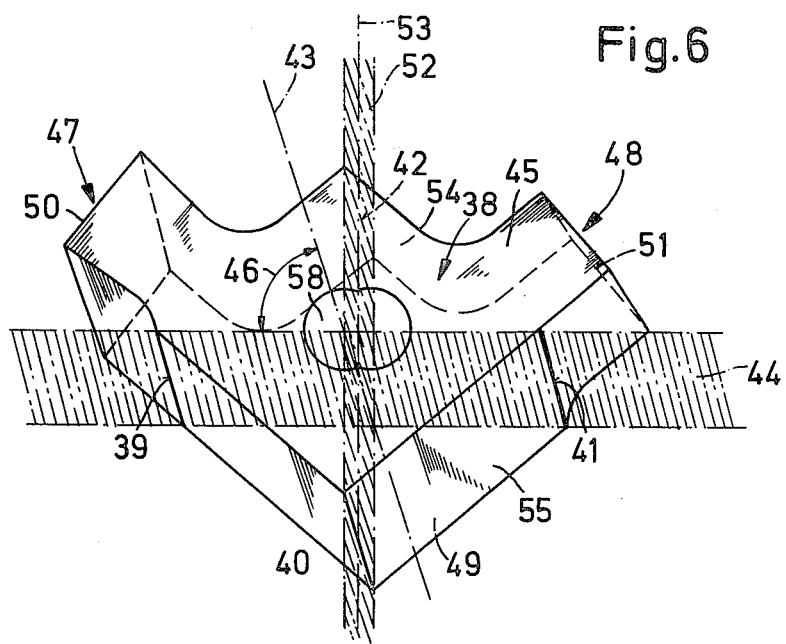

CUTTING TOOL BIT

The invention relates to a clampable cutting bit holder and to a cutting tool comprising such a holder with a cutting bit clamped in place.

According to one aspect of the invention I provide a clampable cutting bit holder for holding a cutting tool bit having a hole therein, said holder comprising a stock and a bit-clamping arrangement, the stock having a recess defined at one end thereof and the bit-clamping arrangement including a support plate, a clampable shank and a pin, the support plate being supported within the said recess with the clampable shank extending within said stock to be clamped therein, and said pin extending outwardly from the recess to engage a cutting tool disposed therein, and means for securing said shank in said stock to urge said cutting bit towards said lower and side walls.

According to a second aspect of the invention there is provided a cutting tool comprising a stock, a bit-clamping arrangement and a cutting tool bit, the stock having a bit-receiving recess defined therein, the bit having first and second substantially parallel planar faces, and sides interconnecting the faces, a first cutting tip associated with said first principal face, and a second cutting tip associated with said second principal face, the two cutting bits being disposed at substantially opposite locations along the periphery of the cutting bit, the bit-clamping arrangement including a support plate, a clampable shank and a pin, the support plate engaging within said recess with the clampable shank extending within the stock to be clamped therein and the pin extending outwardly from the recess to engage a hole formed in the cutting bit and extending inwardly from the two principal faces thereof, the clampable shank being clamped within the stock to urge the cutting bit towards said lower and side walls.

The invention thus simplifies the construction of such holder and cutting tools.

In one embodiment of the invention, further simplification can be achieved by forming the support plate and clampable shank in a single integral member such that the number of individual components necessary for clamping the cutting bit in such clampable holders is reduced.

A further feature of the invention consists therein that the cutting bit is in the form of an oblique prism having an axis inclined, relative to the principal prism faces substantially acutely towards the two cutting edges lying in an imaginary plane perpendicular to the principal faces and including a line joining the cutting tips.

The existence of a front clearance on both the cutting tips ensures that if the side walls of the mounting recess are correctly undercut, when the clampable shank is drawn into the stock on being tightened, the cutting bit is not only drawn toward the side walls of the mounting recess but also drawn downwardly toward the surface of the support plate. The cutting edges and cutting tip not in use are thus safely housed within the mounting recess and cannot be damaged from outside.

In order to ensure a firm contacting engagement with the support plate in the bottom of the mounting recess the clampable shank is positioned with its axis downwardly inclined relative to the surfaces of the support plate and away from the support plate.

In a further development of the invention the cutting tool may be designed for a plunge-cutting turning bit. For this purpose the cutting bit is in the oblique prism form of the cutting bit having four sides meeting at common edges, two adjacent said sides being provided with laterally projecting plunge-cutting portions, and the cutting bit having a plane of symmetry which includes the common edge joining the said two adjacent sides, and the common edge joining the other two said sides.

The subject of the invention will be explained in greater detail with reference to the following purely exemplary embodiments illustrated in the accompanying drawings wherein:

FIG. 4 shows a section taken along line IV—IV of the reversible cutting bit of FIG. 3;

FIG. 5 shows an enlarged representation of a modified embodiment of reversible cutting bit;

FIG. 6 shows a view in perspective of a reversible cutting bit modified for plunge-cutting purposes;

Figure 2:
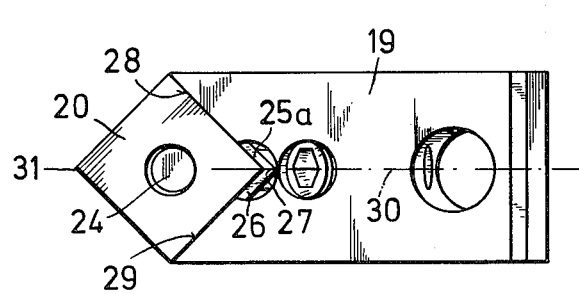
FIG. 2 shows a plan view in the direction of arrow II of FIG. 1.

The reversible cutting bit shown in FIG. 5 has the configuration of an oblique prism, the axis 5 of which is inclined by the angle 4 with respect to the vertical 1 to two principal faces 2, 3 of the prism, and which lies substantially in an imaginary diagonal plane 6 between the two cutting edges 7, 8. The two principal faces 2, 3 of the reversible cutting bit each have the configuration of a rhombus or of a square (FIG. 2). The sides of the reversible cutting bit of FIG. 5 meet at a tip angle 9 or 9a of less than 90°. The cutting bit is provided with a hole (bore) 11 which has an axis 10 extending at an angle 12 of less than 90° to the faces 2, 3. The axis 10 also lies substantially in the diagonal plane 6 but is inclined on the opposite side of the vertical to the prism axis 5.

Figure 3:
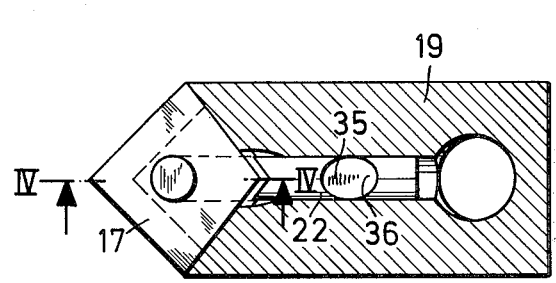
FIG. 3 shows a horizontal section taken along line III—III of FIG. 1, with the cutting bit being slightly modified and not sectioned.

Edges 13, 14 and 15, 16 of the cutting bit form cutting edges, and adjacent these cutting edges in the faces 2, 3 may be formed swarf grooves 17 (FIGS. 3 and 4). The faces 2, 3 are thus situated slightly higher, by the dimension 18, than the edges 13, 14 or 15, 16.

The reversible cutting bit may be formed of any known cutting body material, e.g. hard metal, sinter ceramics. When a clampable cutting bit holder is mentioned in the present Specification there is to be understood quite generally an arrangement for receiving a cutting bit. The "clampable cutting bit holder" may thus be for, and the cutting tool itself comprise, a conventional bit such as a turning tool, milling tool, a cutter head or the like. In essence the cutting tool comprises a stock 19, a reversible cutting bit 20 clamped into a forward recess of the holder 19, a support plate 21 integral with a clampable shank 22, and a clamping screw 23 screwed into the stock 19. The unit of support plate 21 and clampable shank 22 is integral with a pin 24 projecting from the upper surface of the support plate 21 and engaging into the hole 11 of the reversible cutting bit. The longitudinal axis 25 of the pin 24 thus assumes a position coaxial with the axis 10 of the hole 11.

The reversible cutting bit 20 is positioned with the two free faces 25a, 26 which meet at the idle cutting tip 27 engaging corresponding contact surfaces 28, 29 of the stock 19. It is urged into this engagement position by the pin 24. The shank 22 is mounted for longitudinal displacement within the receiving bore 29a in the stock 19. The receiving bore 29a is oriented substantially along the angle bisector 30 between the two contact surfaces 28, 29 (FIG. 2). In the embodiment of FIG. 2 the angle bisector 30 extends approximately in the direction of the longitudinal axis of the stock 19, but it is slightly downwardly inclined, relative to this axis, from the cutting tip 31 toward the rear portion of the stock 19. The longitudinal axis 32 of the clampable shank thus forms an acute angle 34 with the longitudinal axis 33 of the stock.

The clampable shank 22 is provided with a notch 35 in its peripheral surface, the notch having a lateral surface 36, remote from the pin 24, at an acute angle 37 of preferably over 25° to the axis 32 of the clampable shank 22. The lateral surface 36 of the notch 35 is acted upon by a thrust screw 23. The longitudinal median axis of the thrust screw 23 extends substantially perpendicularly of the lateral surface 36 of the notch 35. The resultant of thrust exerted by screw 23 thus extends in a vertical plane passing through the longitudinal axis 33 of the holder.

Although in the exemplary embodiment of FIG. 1 the thrust screw 23 is screwed into the stock 19 from above, the screw can in fact be screwed in from any direction, for example, from either side or from below, as desired, for which purpose suitable threaded bores need then to be fashioned in the stock 19. Alternatively several threaded bores for optional insertion of a thrust screw 23 may be present. The threaded bores for receiving the thrust screw 23 may also be inclined to the stock, for example from a direction at an acute angle to the longitudinal median planes of the stock 19. The lateral surface 36 of the notch 35 must in any event be so oriented as to be acted upon by the thrust screw 23.

The reversible cutting bit 38 (FIG. 6) is also of the basic shape of a quadrilateral oblique prism. The corner edges of this basic shape are designated by the numerals 39, 40, 41 and 42. The prism axis 43 lies in an imaginary vertical plane 44, shown hatched. This plane is so situated that it contains the two oppositely located corner edges 39, 41 of the basic prismatic shape.

The reversible cutting bit 38 has, in similar manner to the reversible cutting bit illustrated in FIG. 5, a prism axis 43 lying in an imaginary vertical plane 44 and at an acute angle 46 relative to upper surface 45 of the prism. The cutting bit 38 is so formed that it is symmetrical about an imaginary, hatched plane 52 connecting and containing the two prism corner edges 40, 42 of the basic prismatic shape. The axis of symmetry 53 of the cutting bit extends parallel to the top surfaces 45, 49 of the reversible plate in the plane 52 of symmetry. When, therefore, the portion of the reversible plate lying to the left, when referring to FIG. 6, of the plane of symmetry 52 is pivoted about the axis of symmetry by 180°, then this portion will coincide with the portion of the reversible bit 38 which lies to the right of the plane of symmetry 52.

In the portion of the cutting bit 38 which, as viewed in FIG. 6, lies on that side of the vertical plane 44 including the corner edge 42 the lateral prism faces of the basic shape are provided with plunge-cutting ends 47, 48 formed in known manner and jutting out beyond the basic shape. Cutting edges 50 and 51 respectively, of the two plunge-cutting ends 47 and 48, are associated with a respective one of the two surfaces 45, 49.

The plunge-cutting ends 47, 48 are so arranged at the lateral prism faces of the basic shape that they are situated in the immediate vicinity of the vertical plane 44. Accordingly, the plunge-cutting ends 47, 48 are aligned such that they form a portion of the sides of an angle whose apex substantially coincides with the prism corner edge 40 of the basic shape.

When, for example, the cutting edge 50 is in an exposed operating position, then the sides 54, 55 of the prism represent the lateral surfaces of the cutting bit 38 contacting the walls of the recess in stock 56, the sides 54 and 55 being situated in the region of the reversible cutting bit 38 which lies on that side of the plane of symmetry 52 remote from the exposed cutting edge.

Figure 1:
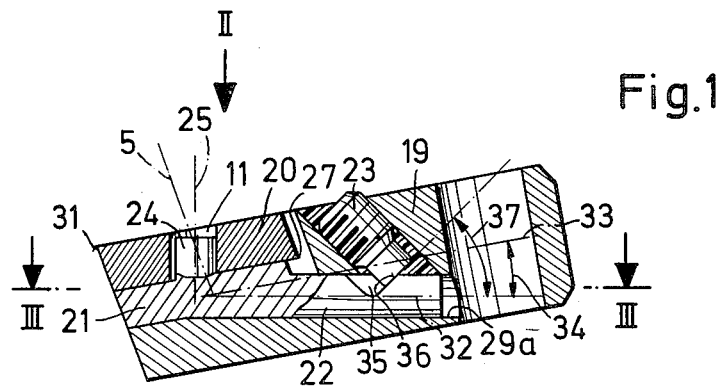
FIG. 1 shows a longitudinal section through the cutting tool according to the invention.

The cutting bit 38 is provided with a through-bore 58 for engagement of the pin 24 of a clampable shank 60 which corresponds to the shank 22 of FIG. 1. The axis of the bore 58 may extend perpendicularly to the principal faces of the prism (FIG. 9), and pass through the point of intersection of the axis of symmetry 53 and prism axis 43 of the basic shape. However, the bore 58 may alternatively be in the form of a slot 59 (FIG. 8) extending in the direction of the vertical plane 44. It is also possible for the bores 58, 59 to be oriented with their longitudinal median axis inclined, with respect to the principal faces 45, 49 of the cutting bit, counter to the inclination of the prism axis 43, in a similar manner to the bore axis 10 of the cutting bit of FIG. 5.

In its forward region (FIGS. 7 and 8) the clampable cutting bit holder 56 is provided with a recess extension 54a for receiving the non-cutting edge 47. A clampable shank 60 carrying a pin 62 at its upper end is clampable within the holder stem 56, the pin 62 being disposed substantially perpendicularly to the shank 60. The clampable shank having the pin 62 projecting into the bore 59 of the cutting bit is, in this embodiment, different from that described with reference to FIGS. 1 and 3, in that the support plate 21 is constructed as a separate component from the clampable shank and pin joined thereto. It is, however, equally possible to give the clampable shank and support plate to be unitary construction, as described with reference to FIGS. 1 and 3.

Figure 8:
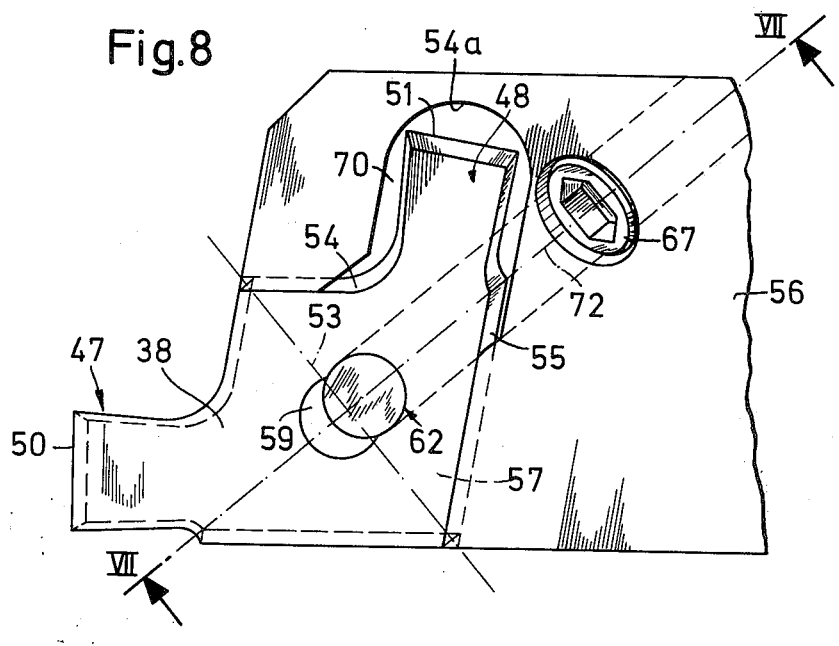
FIG. 8 shows a plan view of the front end of the cutting tool fitted with the cutting bit of FIG. 6.

The clampable shank 60 is mounted within the bore 63 of the stock 56. A notch 64 made in the clampable shank corresponds as to its design and function to the notch 35 of the clampable shank 22 of FIG. 1. A wall 65 of the notch 64 is acted upon, substantially perpendicularly, at angle 66 by a thrust screw 67 screwed into the stock 56, the thrust screw 67 being screwed into a threaded bore of the stock. A support plate 68 is disposed below the reversible cutting bit 38, and the plunge-cutting edge 47 of the cutting bit 38 which is at any given time in an exposed operating position is supported from below by a suitably shaped extension of the support plate which is in turn supported by a protruding rib 69 of the stock 56. The recess 57 provides at its inner end a suitable region 70 for receiving the non-operative cutting edge 48 (FIG. 8). The end of the clampable shank 60 which carries the pin 62 projects loosely through a bore 71 of the support plate 68. By tightening the thrust screw 67 the clampable shank 60 is clamped in the direction of its longitudinal axis 72. The clamping action is effected in similar manner to that described with reference to FIG. 1, the only difference being that the support plate 68 is only acted upon via a separate clampable shank.

Figure 7:
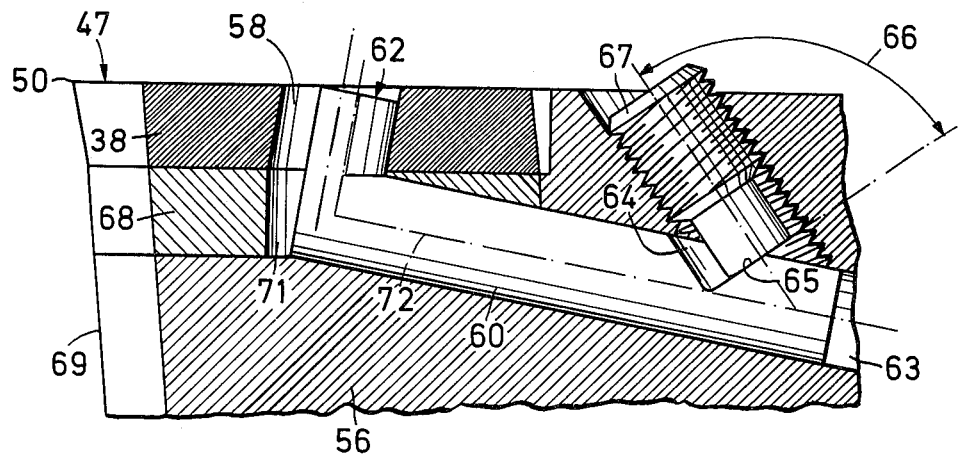
FIG. 7 shows a section, along line VII—VII of FIG. 8, of a modified embodiment of cutting tool.

The longitudinal axis 72 of the clampable shank 60 which lies in the sectional plane of FIG. 7, extends substantially in the imaginary vertical plane 44. In this way, when the clamping screw 67 is tightened the contact pressure between the sides 54 and 55 of the cutting bit 38 and the corresponding support faces of the recess 57 in the stock 56 is of about equal magnitude.

Figure 9:
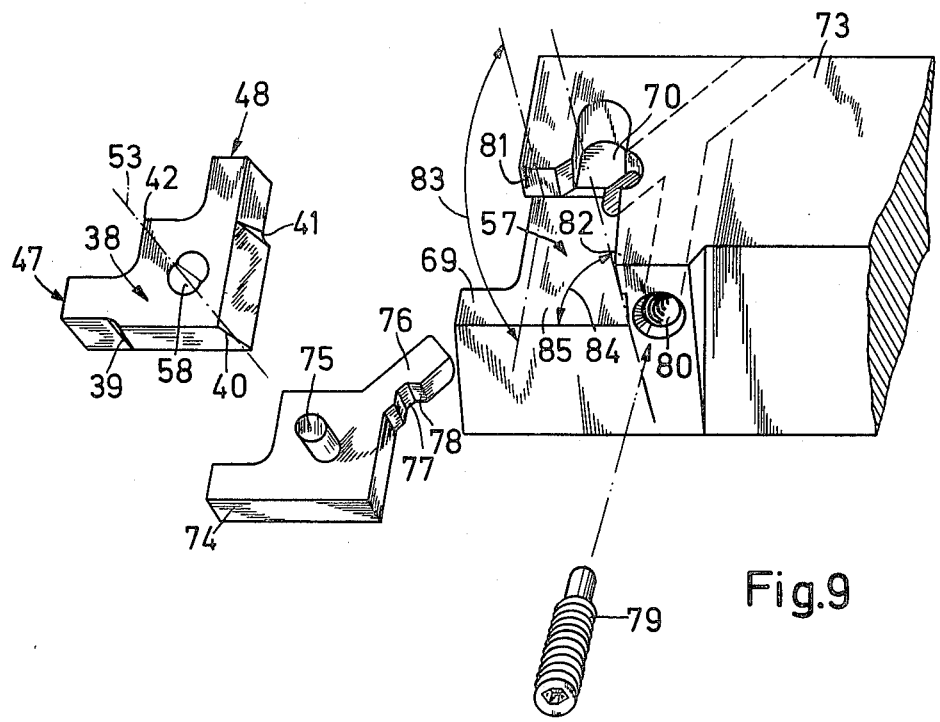
FIG. 9 shows an exploded view of a modified embodiment of the cutting tool of FIG. 7.

A slight modification is involved in the embodiment of FIG. 9. Here the stock 73 carries at its forward end, in an analogous manner to the stock 56, shaped recess 57 having a region 70 for receiving the non-operative plunge-cutting edge 48 of the cutting bit. However, the support plate 74 is now provided with a pin 75, and a clampable shank 76 extending substantially in the direction of the imaginary vertical plane 44 of the cutting bit away from the recess in the stock 73. The bolt 76 has a notch 77 in its side area, which notch is of similar design and acts in similar manner as the notch 35 or 64 described with reference to FIGS. 1, 3 and 7. A sidewall 78 of the notch 77 is perpendicularly acted upon by a thrust screw 79 which is adapted to be screwed into a threaded bore 80 of the stock 73. In the FIG. 9 embodiment the threaded bore 80 is tapped into a lateral surface of the stock 73.

The cutting bit 38 is clamped and released by appropriate slackening of the thrust screws 67 or 79. When cutting edge 50 which is in operating position is worn, then the thrust screw 67 or 79 is slackened to release the clamping pressure exerted on the cutting bit by the pin 62 or 75. The cutting bit 38 can thus be turned about the axis of symmetry 53 (FIG. 8). The worn cutting edge 50 now comes to rest in the place of the previously inoperative cutting edge 51 (FIG. 8) with the edge 51 now in operational position. It is only necessary to retighten the thrust screw 67 or 79 for the pin 62 or 75 to reclamp the cutting bit so that the tool is again ready for use. Because of the inclination of the prism axis 43 at the angle 46 the sides 54, 55 of the cutting bit do not extend perpendicularly of the principal surfaces 45, 49 of the cutting bit. Rather are they positioned at an acute angle with respect to the principal surface 49. The lateral contact faces 81, 82 of the recess 57 are thus also positioned at an acute angle 83 or 84 with respect to the lower surface 85 of the recess. By tightening the pin 62 or 75 the cutting bit will consequently not only be urged into contact with the lateral contact faces 81, 82 of the recess, but it will also be urged against the lower surface 85 thereof.

Figure 10:
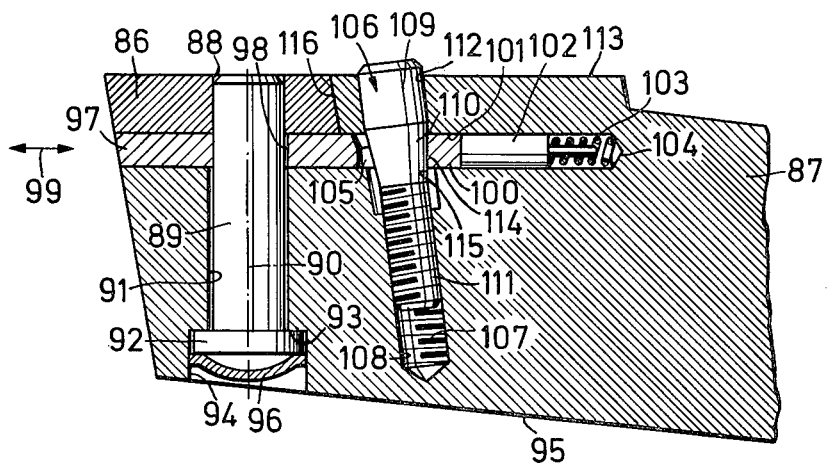
FIG. 10 shows a sectional view of a further modified embodiment of the cutting tool.

In the embodiment of FIG. 10 the cutting bit is designated by the reference numeral 86. It may be of any desired design, i.e., analogous to the FIG. 2, FIG. 4 or FIG. 6 design. The cutting bit 86 is mounted in a recess, similar to that described with reference to FIGS. 1 to 9, arranged at the forward end of a stock 87. A pin 89 engages loosely in a hole 88 of the cutting bit. The pin 89 is cylindrical and has a longitudinal axis 90 which extends in the axial direction of the hole 88. The pin 89 also engages loosely in a bore 91 of the stock 87 such that it can be shifted or turned by a certain amount in any direction perpendicular to its longitudinal axis 90. At its end remote from the cutting bit 86 the pin 89 has a portion of increased diameter 92. This portion of the pin contacts a shoulder 93 of an enlarged extension 94 of the bore 91. In this way the pin 89 cannot be moved toward the cutting bit 86, but at the same time the pin 89 can be readily introduced into the bore 91. The enlarged end of the bore 91 is closed by a cap 96 which for example co-operates positively with the walls of the extension 94.

A support plate 97 has a hole 98 registering with the hole 88 of the cutting bit 86 and through which the pin 89 loosely projects. In particular, the support plate 97 rests on the bottom of the forward recess of the stock 87 in such manner as to be in contact with the lower principal face of the cutting bit 86.

The support plate 97 is mounted for longitudinal displacement in the direction of the arrow 99, and its rear end 100 projects into a horizontal slit 101 of the stock 87 to form a clampable shank. The end 100 contacts a solid abutment 102 which is resiliently biased and supported via a compression spring 103 at the head end 104 of a guidance bore in the stock 87.

In the region of the end 100 the support plate 97 has a further bore 105 extending laterally of the cutting bit 86. Into this bore 105 projects a clamping screw 106 anchored by thread means 107 in a bore 108 of the stock 87. The clamping screw 106 has a head 109, a conical stem portion 110, and a threaded portion 111. The conical stem portion 110 is disposed in the region of the bore 105 adjacent the support plate 97. The screw head 109 is guided in a receiving bore 112 of the stock 87, and the clamping screw 106 is screwed into the stock 87 from an upper surface 113 thereof. The bore 105 of the support plate 97 extends perpendicularly of the surface of the support plate 97. The clamping screw 106 is obliquely screwed into the stock 87 such that the peripheral surface 114 of the conical stem portion 110, engages the righthand side 115 (as viewed in FIG. 10) of the wall of the bore 105. When the securing screw 106 is screwed inward the surface 114 presses against the wall 115 of the bore 105 in the support plate 97 thereby urging the support plate toward the right (FIG. 10) counter to the pressure of the spring 103. By virtue of the hole 98 the support plate 97 entrains the pin 89 in the shifting movement, and the cutting bit is thereby also urged toward the right and into contact with the lateral support face 116 of the stock 87. When the receiving screw 106 has been slackened the compression spring 103 ensures that the support plate 97 is urged toward the left as seen in FIG. 10 and the pin 89 thus releases the cutting bit 86.

I claim:
1. A reversible cutting tool bit in the shape of a flat prism comprising:
 a. first and second quadrilateral principal faces extending parallel to one another;
 b. four lateral faces interconnecting said principal faces, said lateral faces intersecting one another in four lateral edges;
 c. two cutting tips, the one being located at the intersection of one of said lateral edges with said first principal face, the other being located diagonally from the one cutting tip at the intersection of an- other lateral edge with said second principal face;

d. means defining an aperture passing through said principal faces and adapted to accommodate a tool bit securing pin of a tool bit holder, said aperture having an axis lying in said plane and being inclined with respect to said principal faces in a direction oriented away from said one and said other cutting tips; and e. a tool bit axis lying in an imaginary plane defined by the two lateral edges that contain said cutting tips; said axis being inclined with respect to said principal faces in a direction oriented towards said one and said other cutting tips.

2. A reversible cutting tool bit comprising:

a. first and second quadrilateral principal faces extending parallel to one another and constituting the cutting faces of the tool bit;

b. four lateral faces interconnecting said principal faces, said lateral faces intersecting one another in four lateral edges;

c. two plunge-cutting portions integral with and extending laterally away from two adjoining lateral faces; said plunge-cutting portions each having a cutting edge lying, respectively, in the one and the other of said principal faces; said plunge-cutting portions being disposed on one and the same side of an imaginary diagonal plane defined by two of said four lateral edges and being disposed symmetrically on one and the other side of a symmetry plane defined by the other two of said four lateral edges; and d. means defining an aperture passing through said principal faces and adapted to accommodate a tool bit securing pin of a tool bit holder.

3. A tool bit as defined in claim 2, wherein said plunge-cutting portions are disposed in the immediate vicinity of the two lateral edges defining said imaginary diagonal plane; said plunge-cutting portions being disposed with respect to one another at an angle, the apex of which coincides with that one of the two lateral edges defining said symmetry plane which lies on the other side of said diagonal plane with respect to said plunge-cutting portions.

4. A tool bit as defined in claim 2, said lateral faces are support faces to be engaged by conforming abutment faces of a tool holder, the engagement being effected along those two adjoining lateral sides of said tool bit that are remote from the momentarily operative one of said plunge-cutting portions.

5. A reversible cutting tool bit comprising:

a. first and second quadrilateral principal faces extending parallel to one another;

b. four lateral faces interconnecting said principal faces, said lateral faces intersecting one another in four lateral edges;

c. two plunge-cutting portions integral with and extending laterally away from two adjoining lateral faces; said plunge-cutting portions being disposed on one and the same side of an imaginary diagonal plane defined by two of said four lateral edges and being disposed symmetrically on one and the other side of a symmetry plane defined by the other two of said four lateral edges; and d. means defining an aperture passing through said principal faces and adapted to accommodate a tool bit securing pin of a tool bit holder, said aperture having an axis lying in said diagonal plane and being inclined with respect to said principal faces.

* * * * *